United States Patent [19]

Dutcher

[11] Patent Number: 5,775,807
[45] Date of Patent: Jul. 7, 1998

[54] INTRODUCING A PLURALITY OF TEMPERATURE MEASURING DEVICES INTO A PRESSURE VESSEL

[75] Inventor: Dale Eugene Dutcher, Pasadena, Tex.

[73] Assignee: Gay Engineering & Sales Co., Inc., Pasadena, Tex.

[21] Appl. No.: 606,864

[22] Filed: Feb. 26, 1996

[51] Int. Cl.$^6$ ............................ G01K 1/14; G01K 13/00
[52] U.S. Cl. ............... 374/143; 374/166; 374/208; 374/179; 374/150; 136/230
[58] Field of Search ............................ 374/179, 208, 374/166, 150, 143, 148; 136/230

[56] References Cited

U.S. PATENT DOCUMENTS

| | | | |
|---|---|---|---|
| 3,165,426 | 1/1965 | Beckman | 374/179 |
| 3,263,502 | 8/1966 | Springfield | 374/179 |
| 3,845,661 | 11/1974 | Hollweck et al. | 374/208 |
| 4,376,227 | 3/1983 | Hilborn | 135/242 |
| 4,385,197 | 5/1983 | Schwagerman | 136/230 |
| 4,410,756 | 10/1983 | Schwagerman | 374/208 |
| 4,428,686 | 1/1984 | Brax | 136/230 |
| 4,653,935 | 3/1987 | Daily | 374/208 |
| 4,772,132 | 9/1988 | Hofmann | 374/143 |
| 4,797,007 | 1/1989 | Elmore, III | 374/143 |
| 5,070,706 | 12/1991 | Waters et al. | 374/143 |
| 5,163,321 | 11/1992 | Perales | 374/143 |
| 5,199,789 | 4/1993 | Mauric | 374/143 |
| 5,232,517 | 8/1993 | Hilborn et al. | 136/233 |

FOREIGN PATENT DOCUMENTS

| 0086725 | 5/1982 | Japan | 374/179 |
|---|---|---|---|

*Primary Examiner*—Diego F. F. Gutierrez
*Attorney, Agent, or Firm*—Vaden, Eickenroht & Thompson, L.L.P.

[57] ABSTRACT

Apparatus maximizing multitubular penetration of a pressure vessel wherein a plurality of tubular sections are series joined to and concentrically aligned with an opening of a pressure vessel, such tubular sections presenting an internal diameter being greater than the I.D. of the effective entrance into said vessel; and a plurality of thermocouple cables passing from outside said apparatus, and into said pressure vessel, said thermocouple cables being fixedly secured to pressure-retaining discs.

12 Claims, 5 Drawing Sheets

INTRODUCING A PLURALITY OF TEMPERATURE MEASURING DEVICES INTO A PRESSURE VESSEL

BACKGROUND OF THE INVENTION

In the chemical and refining industries, a company's profitability is directly related to the efficiencies of the various processes involved in producing its marketable products. Temperature regulation, within the plant's reactors, controls one of the variables which influences the efficiency of the reaction, and thereby the volume of throughput. As catalyst and related technology evolves, the reactors are oftentimes pushed to higher operating temperatures and pressures. Accurate and dependable information related to these variables is therefore critical for safe and efficient operation of pressure vessels. Since many pressure vessels are somewhat aged, i.e., constructed 30, 40 or even 50 years ago, the operative needs have changed. Far fewer access locations were then required. Likewise, the size of such access locations, i.e., nozzles, or ports, were relatively small in comparison with today's units. Designers are therefore oftentimes faced with the problem of increasing the number of temperature measuring points within the reactor without having the liberty of increasing the number of access ports or of the size thereof.

The use of bolt-on, flanged expanders, such as described by U.S. Pat. No. 5,232,517, has served as one effective means for increasing the number of measurement devices entering the reactor. Likewise, the securing of thermocouple guide tubes to a fixed disc is illustrated by U.S. Pat. No. 4,376,227. There are, however, drawbacks to the expander design and coupling mechanism described by such patents. Many technicians prefer not to use such expanders since they add one or more gasketed sealing points exposed to reactor pressure, thereby increasing the possibility of leakage of the volatile process fluids. Further, elaborate expander designs may involve greater space demands where little space is available. Additionally, as the size of the expanders increases, to allow for multiple flanged seal points, the use of expensive heat tracing systems may be required. Further, additional flange thickness may be required. This invention is directed to maximizing the number of reactor temperature measuring devices without generating the problems caused by substantially increasing the number of flanged seal points.

BRIEF DESCRIPTION OF THE INVENTION

Multiple temperature measurement cables pass through the apparatus or standard flange which matches the flange on an exterior pressure vessel nozzle, or which is secured to the vessel's interior wall. A primary chamber-forming, tubular section attaches at one end to the said apparatus flange and provides a separation area for the temperature measurement cables. A secondary chamber-forming, tubular section is preferably joined at one end to the other end of said primary tubular section via a first pressure retaining disc. A second pressure retaining disc would close the other end of the second tube. The temperature measurement cables extend, at one end, into the pressure vessel, wherein measurements are performed. Moving in the direction of said cables' other end, they extend through aligned apertures in said disc or discs, depending on whether there are one or two chambers, and thereafter to instrumentation. Each cable is welded to one face of each of said discs.

DESCRIPTION OF A PREFERRED EMBODIMENT

Figure 1:
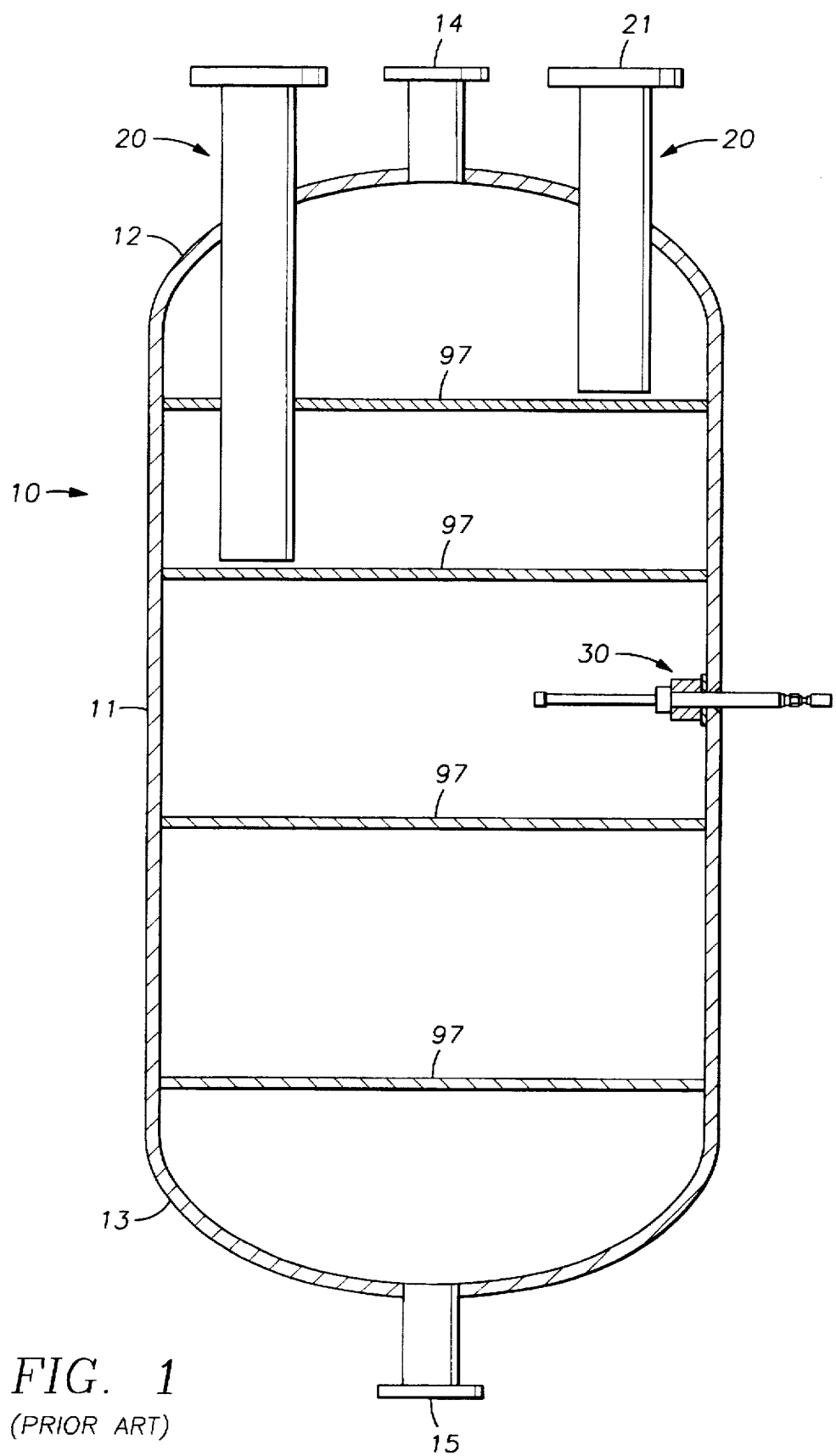
FIG. 1 is a, somewhat schematic, vertical axial section through a typical pressure vessel, illustrating both exteriorly and interiorly mounted apparatus.

FIG. 1 illustrates a reactor, or pressure vessel 10, as commonly used in the petroleum refining and petrochemical industry. The cylindrical body portion 11 includes top and bottom covers 12 and 13. Material, or throughput, inlet and outlet, 14 and 15, respectively, are provided in such covers. Such inlet and outlet may be reversed in some applications. Vessel 10 also is shown to possess a plurality of nozzles 20 and internally mounted fittings 30, providing access to various levels of the vessel's interior. A number of such fittings have been provided at different such levels. These nozzles permit providing and monitoring control equipment. In the prior art example of FIG. 1, generalized catalyst beds 97 are provided the reactor. This invention provides the mechanism for increasing the quantity of thermocouples that may be inserted into and through such nozzles and fittings.

Figure 2:
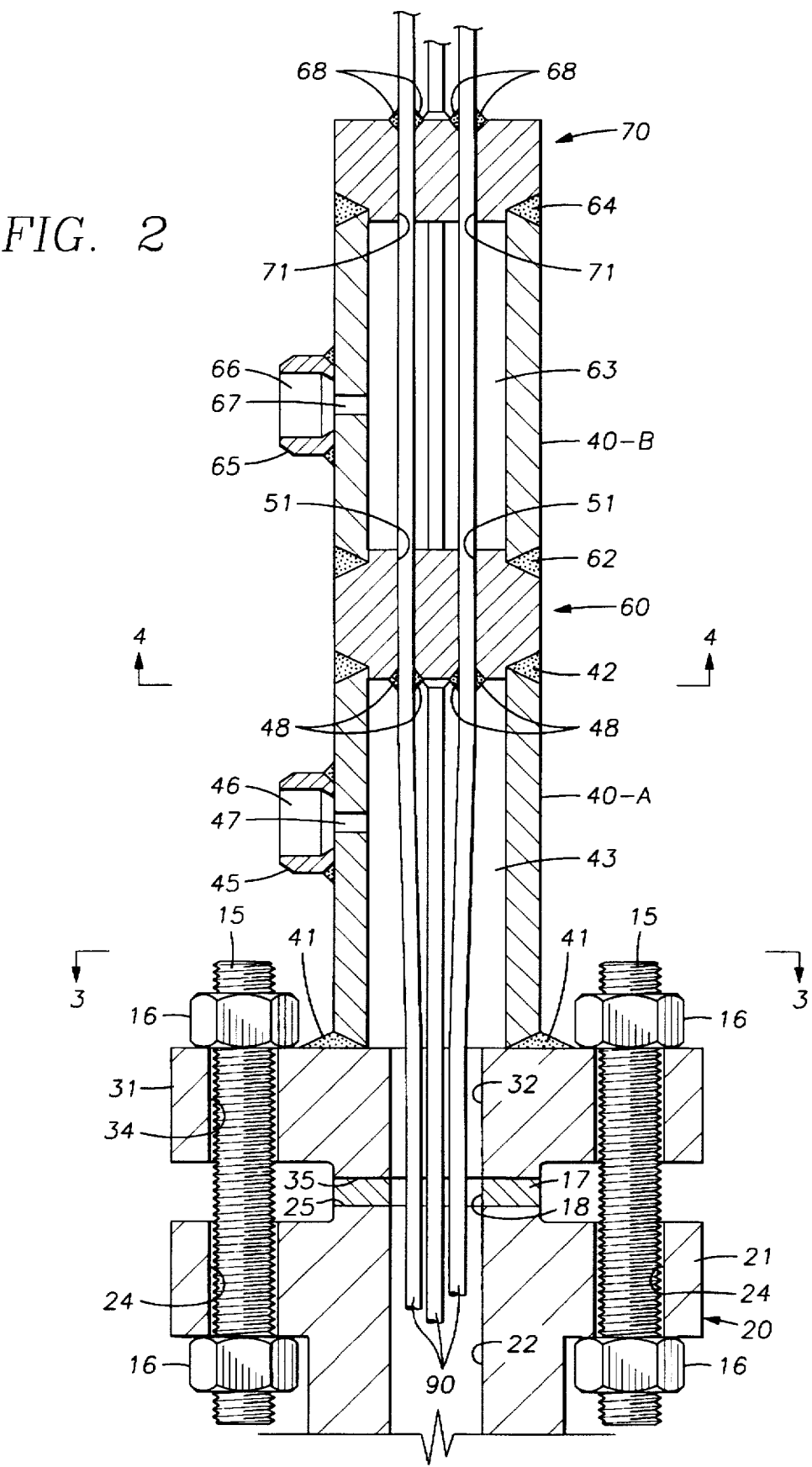
FIG. 2 is an axial section through the flange and tubular sections of one embodiment of an exteriorly mounted version of the invention, with a plurality of thermocouple cables being shown in plan.

FIG. 2 depicts flange 21 of a reactor nozzle 20. Such nozzle may extend to a chosen depth within the pressure vessel such as described in the previously mentioned U.S. Pat. No. 5,232,517 and would include a central bore, or passageway 22, communicating with the interior of said vessel 10. Flange 21, near its peripheral edge, includes a circle of bolt holes 24. Said flange, on one side, also includes a raised annular ridge 25. Thus far, nothing new has been described.

Figure 3:
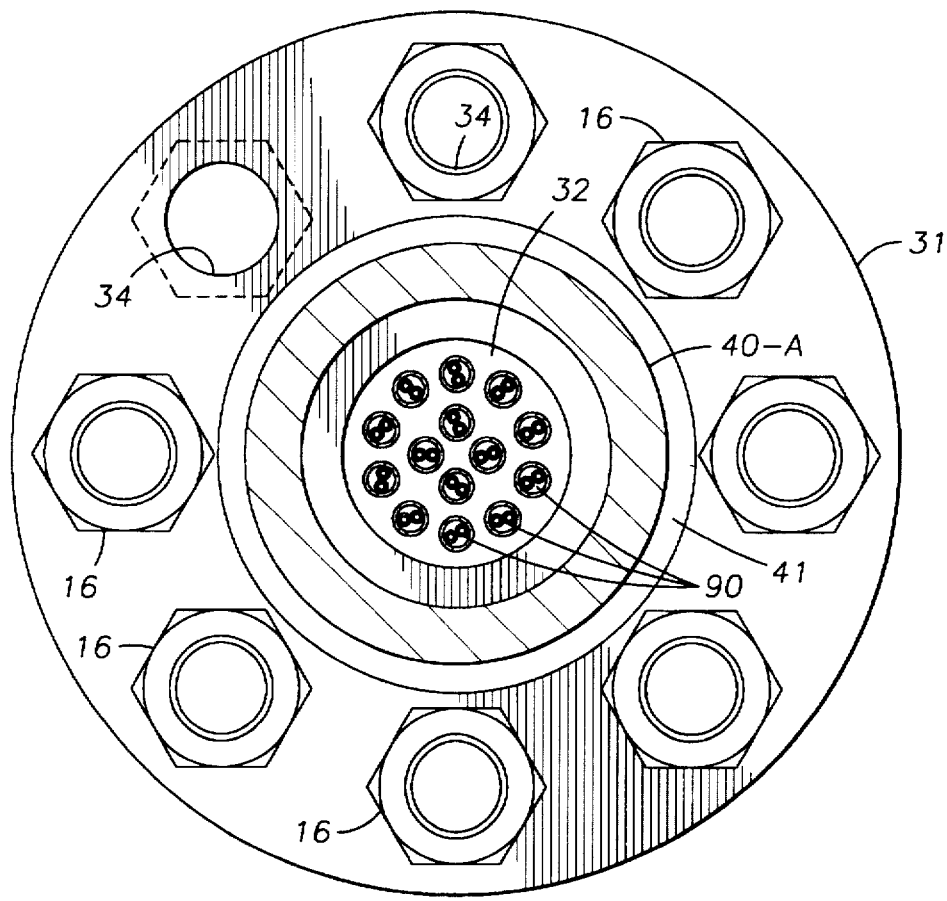
FIG. 3 is a section, taken along lines 3—3 of FIG. 2, illustrating the flange 31.
Figure 4:
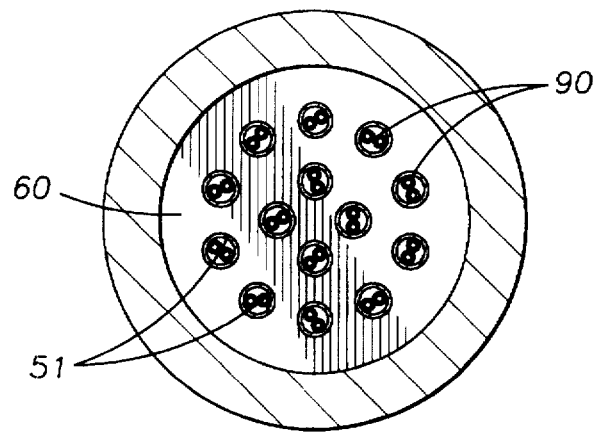
FIG. 4 is a section, taken along lines 4—4 of FIG. 2, illustrating the retaining disc 60.

Consider now this invention, as shown by FIGS. 2, 3 and 4. The invention may be considered a nozzle or vessel adapter which may be exteriorly or interiorly mounted. It includes flange 31, which is a counterpart to nozzle flange 21. Like its counterpart, member 31 includes, near its peripheral edge, a circle of bolt holes 34. It also includes a central bore or passageway 32, therethrough, and a raised annular ridge 35, facing nozzle ridge 25. Bolts 15 are obviously inserted through aligned bolt holes 24, 34, and, when made up by nuts 16, sealingly clamp gasket 17 between said raised ridges 25, 35 to prevent leakage of vessel fluid from said flange juncture. Said gasket includes central aperture 18 therethrough.

Opposite the adapter flange's raised ridge, a tubular extension depends. This cylindrical extension is particularly unique in that it comprises dual, series connected, tubular sections 40-A and 40-B. These sections have similar internal diameters, which are each equal to or greater than the communicating apertures of flange 31, gasket 17 and nozzle 20, namely passageways 32, 18 and 22. They form primary and secondary chambers 43 and 63. Inner tubular section 40-A is sealingly secured at one end to one side of adapter flange 31, as by weld 41. The other end of said tubular section is welded, at 42, to a primary machined pressure retaining plate or disc 60. Whenever, hereafter, the term weld or welded is used, this should be taken to include other appropriate attachment means or methods such as brazing or, in some cases, mechanical connections. Likewise, such welds may be made radiographable, if desired.

One end of outer, or secondary tubular section 40-B is likewise welded, at 62, to said retaining disc 60, opposite weld 42. The other end of tubular section 40-B is welded, at 64, to outer or secondary machined pressure retaining disc 70.

Tubular sections 40-A and 40-B, are provided respectively with pressure taps 45 and 65, each having a cavity 46, 66, respectively, in communication with tubular chambers 43, 63, via throttled openings 47, 67 through a wall in said tubular sections.

One significant difference should be noted on the difference between throttled openings 47 and 67. Opening 67 has two functions... a) means for pressure testing, and 2) means for monitoring the secondary containment chamber to give the plant operators a signal if there is a loss of a primary seal which leaks pressure into the secondary chamber.

Throttled opening 47 is more of an optional opening which has one significant function . . . . It provides a means for monitoring the actual "on-line" vessel pressure since it is always under pressure while the vessel is operational. In the past, operators would have to get this pressure reading through a separate opening vessel. This allows for both pressure and temperature to be monitored through a single opening. This is a big bonus for vessels that are designed with multiple nozzles along the side of the vessel at different elevations. It is desirable to take these pressure readings at different elevations to monitor pressure drop through the vessel. High differential pressure readings is usually a direct indication of clogging of the reactor.

Also, the significance of the openings being throttled is a subtle but important feature. By throttling the opening down to a very small size, any process leakage resulting from a loss of the primary seal would be throttled down to a very small flow, which is more desirable than a larger opening resulting in a higher leakage rate.

Members 90 are each thermocouple containing cables, or sometimes referred to as sheathed thermocouples. In a known fashion, each cable includes among possibly other things, a pair of wires, of dissimilar materials insulatingly imbedded within a jacket or sheath. One end of each wire, not shown, would be joined to form the junction, and positioned within vessel 10. The other end of each wire, also not shown, would be attached to measuring apparatus, outside such vessel 10. Thermocouples of this type are well known in the art, as exemplified by U.S. Pat. No. 5,232,517.

FIG. 4 depicts a plurality of spaced apart bores or apertures 51 through pressure retaining disc 60. These apertures are shown to be arcuately spaced along two different radii. It should be noted that there is substantial spacing between adjacent apertures. Of course the spacing could be varied by positioning the apertures around additional radii or by using other geometric patterns. Secondary pressure retaining disc 70 would have a like array of apertures 71 therethrough. As illustrated, some 14 apertures, numbered 51 and 71, respectively, are provided through each pressure retaining disc. Naturally, this number may vary. Normally, each thermocouple cable 90 would pass through its respective apertures 51, 71, and pass through flange bore 32, gasket aperture 18, nozzle bore 22, to the desired position interior of vessel 10. In other words, the array of apertures 51 forms an area substantially greater than the area of passageway 32, which approximates passageway 22.

By virtue of the enlarged internal diameters of tubes 40-A and 40-B, relative to that of flange passageway 32, a bundle of thermocouple cables 90 may be closely or tightly associated while passing through passageways 22, 18 and 32. Within tubes 40-A, 40-B, they are spread apart. This greatly increases the ease of sealingly welding each cable 90 to the face of primary sealing disc 60 nearest vessel 10, as at 48, without damaging adjacent cables. Similarly, each cable is welded, as at 68, to the face of secondary sealing disc 70. The spacing of the cable apertures 71 being like that of apertures 51.

In manufacture and assembly, the appropriate apertures would be formed in the pressure retaining discs 60, 70, a preferable form being as illustrated in FIG. 4. On inserting each thermocouple cable 90 the selected length beyond disc 60, such cable is welded to the downstream face of disc 60 and, assuming that series tubes are used, the upstream face of disc 70. Tubes 40-A and 40-B are respectively welded to flange 31-disc 60, and disc 60–disc 70. Said tubes 40-A, 40-B will have had throttle openings 47, 67 drilled or otherwise machined, as well as had taps 45, 65 welded to said tubes' outer wall. At this time, the security of the various welds may be tested in a number of manners, such as by pressure testing, radiography, or the like. Pressure testing is facilitated by securing one end of a conduit (not shown) to tap nipples 45, 65, the other conduit ends leading to appropriate pressure instrumentation or gauges. During operation, such taps may be plugged, or retain communication with the pressure instrumentation.

After assembly, the junction ends of the thermocouple cables 90 would be inserted through gasket and nozzle flange apertures 18, 22, and the two flanges 21, 31 secured by bolts 15, sealingly compressing gasket 17 between raised annular faces 25, 35.

The junction ends of cables 90 would extend to the desired measuring point. The other end, carrying the loose ends of the pair of leads, would extend to appropriate instrumentation (not shown) for converting and displaying the emf generated into a readable form indicative of temperature.

Figure 5:
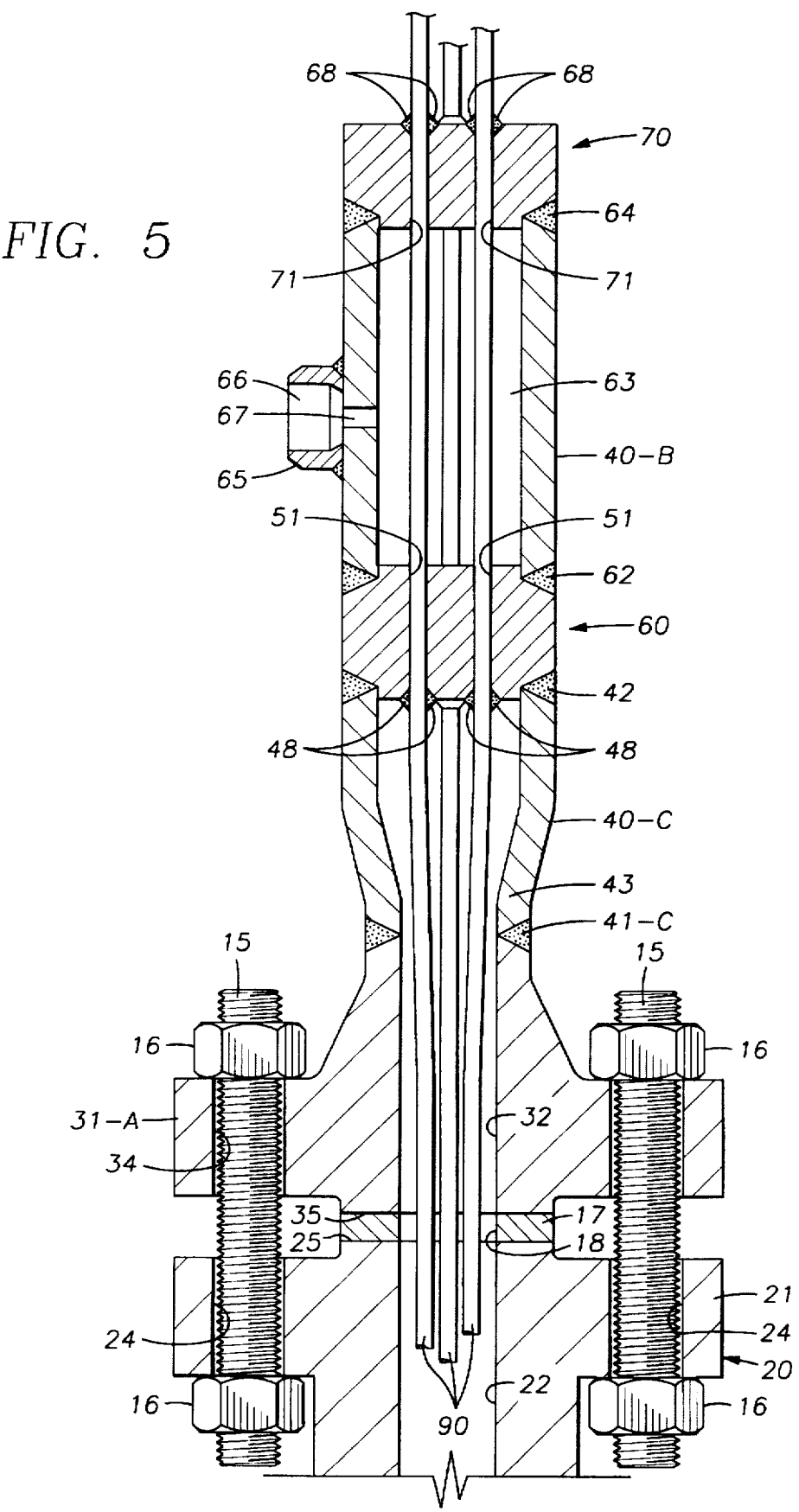
FIG. 5 is a modification of the embodiment of FIG. 2.

In the embodiment of FIG. 5, like numerals indicate parts similar to those of FIG. 2, and need not be further described. The only significant differentiation is as follows. Weld neck flange 31-A, in place of adapter flange 31, of FIG. 2, would be welded at 41-C to concentric reducer 40-C, the latter replacing tubular section 40-A of FIG. 2. Finally, while no pressure tap, such as member 45 in FIG. 2, is depicted through the wall of reducer 40-C, it can be provided, if desired. This embodiment of FIG. 5 allows the use of readily available components, particularly weld neck flange 31-A and concentric reducer. Otherwise, the outside mounted devices of FIGS. 2 and 5 are functionally equivalent.

Figure 6:
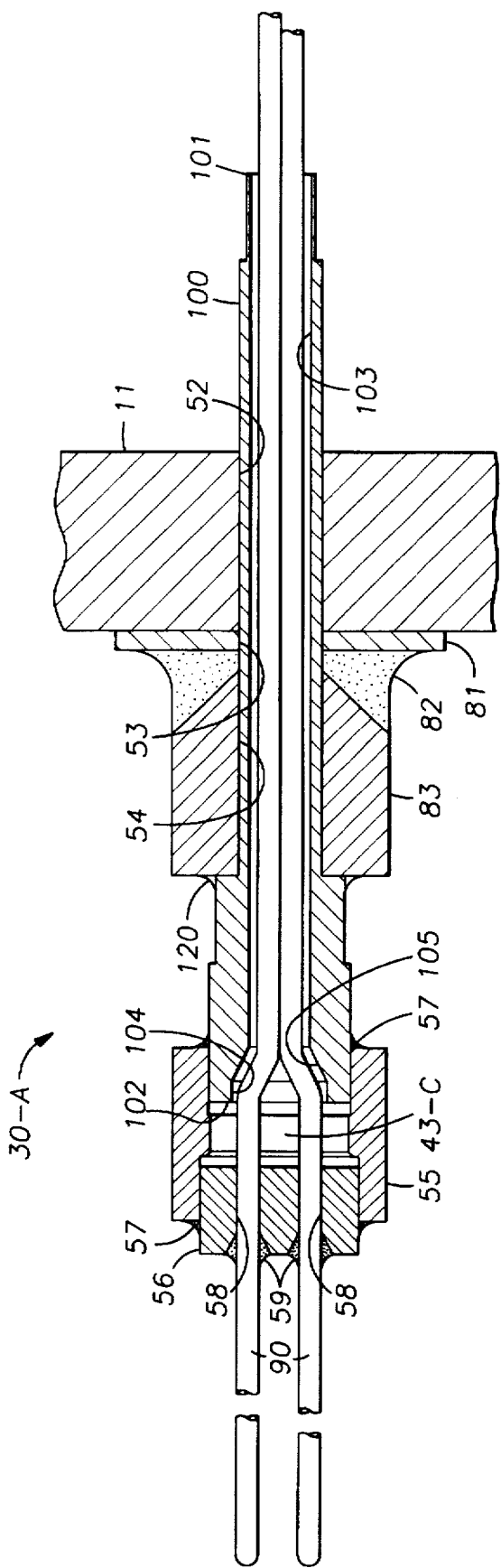
FIG. 6 is an axial section through an internally mounted version of the invention.

Addressing a slightly different structural geography, while using the same previously described concepts, is the internally mounted assembly 30-A of FIG. 6. There, the vessel or reactor wall is likewise illustrated at 11. Mounting plate 81 is secured to and depends from wall 11, and is welded at 82 to cylindrical boss 83. Members 11, 81 and 83 possess aligned bores 52, 53 and 54, respectively. Stepped thermocouple tube 100 includes reduced O.D. end 101 and opposed enlarged end 102. Said tube is welded to boss 83 at 120. The internal bore 103 of tube 100 includes enlarged counterbore 104 the two being linked by shoulder 105. This forms an expander reducer section for thermocouple cable 90. Cylindrical coupling 55 is seen to be welded to both thermocouple tube 100, near its end 102, and to cylindrical seal cap 56, such welds being numbered 57. Also, seal cap 56 possesses a plurality of bores 58, to accommodate thermocouple cables 90. An array of such bores 58 may be arranged similarly to those of FIG. 4. Pressure chamber 43-C is formed when cables 90 are welded at 59 to end cap 56. Once installed, as by inserting cables 90 through tube 100, after welding such cables to cap 56, and then welding the cap to coupling 55, the operation of this internally mounted assembly is substantially the same as the previously described exteriorly mounted embodiments.

Although only limited embodiments have been described, it should be obvious that numerous modifications would be possible by one skilled in the art without departing from the spirit of the invention, the scope of which is limited only by the following claims.

I claim:

1. An apparatus for introducing a plurality of temperature measuring devices into a pressure vessel through an opening therein for measuring temperatures within the vessel, said apparatus comprising:

a tubular body having an opening through which the plurality of temperature measuring devices are introduced into the vessel;

means for mounting said body to the vessel at the opening in the vessel such that the pressure in the vessel is communicated to said body through the opening in the vessel and the opening in said body;

primary pressure retaining disc means connected to said body across the opening therein, said primary disc means and said mounting means together forming a first chamber within said body; and said primary disc means having a plurality of apertures therethrough providing sealable passageways within said body for introducing the plurality of temperature measuring devices into the vessel, the apertures forming an array of greater area than that of the opening in the vessel.

2. The apparatus of claim 1 wherein said mounting means includes a flange secured to said body adjacent the first chamber, the flange including a circle of bolt holes compatible with a like circle of holes carried by a nozzle of the vessel, the nozzle providing the opening in the vessel.

3. The apparatus of claim 1, further comprising a plurality of temperature measuring cable means, each of the plurality of said cable means passing through said body, through one of the apertures of said primary disc means, and through the opening in the vessel for placement at a desired location within the vessel.

4. The apparatus of claim 3 wherein each of the plurality of cable means is sealingly welded to said primary disc means.

5. The apparatus of claim 1, further comprising pressure test means communicating between the interior of the first chamber and the exterior thereof.

6. The apparatus of claim 5 wherein the pressure test means includes throttle means positioned through a wall of said body in communication with the first chamber.

7. An apparatus for introducing a plurality of temperature measuring devices into a pressure vessel through a nozzle of the vessel for measuring temperatures within the vessel, said apparatus comprising:

a tubular body having an opening through which the plurality of temperature measuring devices are introduced into the vessel;

means for mounting said body to the nozzle such that the pressure in the vessel is communicated to said body through the nozzle and the opening in said body;

first and second pressure retaining disc means connected to said body at spaced locations across the opening therein, said first disc means and said mounting means together forming a first chamber within said body, said first disc means and said second disc means together forming a second chamber within said body;

and each of said disc means having a plurality of apertures therethrough providing sealable passageways within said body for introducing the plurality of temperature measuring devices into the vessel, the apertures of each of said disc means forming like arrays, each array being of greater area than that of the nozzle opening.

8. The apparatus of claim 7 wherein said mounting means includes a flange secured to said body adjacent the first chamber, the flange including a circle of bolt holes compatible with a like circle of holes carried by a flange of the pressure vessel nozzle.

9. The apparatus of claim 7, further comprising pressure test means positioned in said body for communication with each of the chambers.

10. The apparatus of claim 7, further comprising a plurality of temperature measuring cable means, each of the plurality of cable means passing through said body, through one aperture in each of said disc means, and through the nozzle for placement at a desired location within the vessel.

11. The apparatus of claim 10 wherein each of the plurality of cable means is sealingly welded to each said disc means.

12. The apparatus of claim 7, wherein said body includes first and second tubular sections connected via said first disc means.

* * * * *